Patented Feb. 3, 1925.

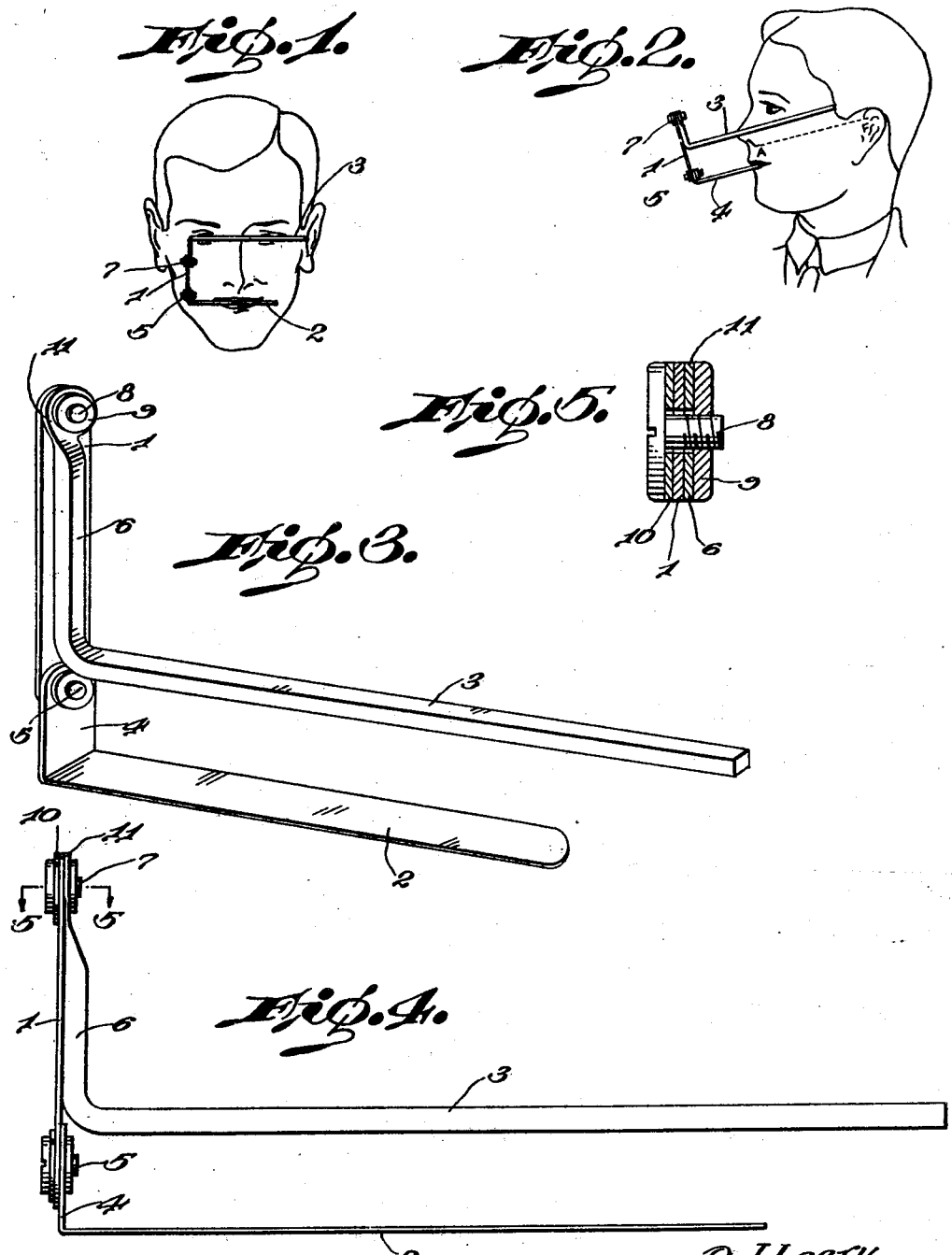

1,525,305

UNITED STATES PATENT OFFICE.

DANIEL J. LEARY, OF JANESVILLE, WISCONSIN.

DENTAL INSTRUMENT.

Application filed May 11, 1923. Serial No. 638,326.

*To all whom it may concern:*

Be it known that I, DANIEL J. LEARY, a citizen of the United States, residing at Janesville, in the county of Rock and State of Wisconsin, have invented new and useful Improvements in Dental Instruments, of which the following is a specification.

This invention relates to dental instruments and more particularly to an adjustable occlusal plane parallelometer.

An object of this invention is to provide an adjustable occlusal plane parallelometer or dental instrument which will provide the user a more scientific and accurate means of determining the location and parallelism of the occlusal planes of dentures with respect to certain landmarks on the human head.

Heretofore it has been the general practice of operators in determining the occlusal plane for dentures, to place a flat straight edge in the patient's mouth and by holding the same in contact with the occlusal rims to try and determine the location and parallelism of the occlusal plane a difficult and inaccurate procedure on account of part of the straight edge being concealed by the lips and cheeks of the patient.

This occlusal plane, which has generally been accepted because it is useful in arranging artificial teeth, is generally parallel to a line on the outside of the cheek from the upper margin of the external auditory meatus to the lowest point of the wing (alæ) of the nose. This line gives a level to which the antero-posterior plane of the occlusal plane can be paralleled.

Viewing the patient from the front the occlusal plane is paralleled horizontally to a line drawn through the pupils of the patient's eyes.

The practical value of the occlusal plane established may be described as follows: It establishes a generally accepted starting point for the arrangement of the artificial teeth: It assists in mounting models of the jaws in articulators: Its use greatly facilitates the achievement of pleasing esthetic effects: Properly located it adds greatly to the efficiency and comfort of the dentures.

All the above results are made more certain by the use of the adjustable occlusal plane parallelometer for the present invention comprehends the provision of an instrument comprising a pair of pivotally parallel members one of which is adapted to be placed in the mouth in contact with the occlusal plane, being tested and established, and the other member moved on the exterior of the face and from its position the parallelism and location of the plane in the mouth can be checked against the lines drawn through the land marks on the patient's face and thus the occlusal plane can be more easily, scientifically and accurately determined.

Other objects of the invention will appear in the following detailed description taken in connection with the accompanying drawings wherein:—

Fig. 1 is a front elevation of the parallelometer showing it in position on the face of the patient for determining the occlusal plane horizontally.

Fig. 2 is a side elevation of the parallelometer showing it in position on the face of the patient for determining the occlusal plane antero-posterior.

Fig. 3 is a perspective view of the parallelometer.

Fig. 4 is a side elevation of the parallelometer showing it folded.

Fig. 5 is a detail section on the line 4—4 of Fig. 4.

Referring more particularly to the drawings, the novel dental parallelometer or instrument comprises a flat carrying bar 1 which has the parallel measuring bars 2 and 3 pivotally connected to its opposite ends and extending in the same direction therefrom. The bar 2 which is flat and relatively thin is adapted to be engaged in the mouth of the patient and will hereafter be referred to as the mouth bar. The mouth bar 2 has its end 4 bent at right angles to the major portion of the bar and pivotally connected by a pivot joint 5. The measuring bar 3 has an angled end 6 thereon which extends at right angles to the major portion of the bar 3 and is pivotally connected by means of a pivot joint 7 to the bar 1. The pivot joints 5 and 7 are similar in construction and each comprises the threaded bolt or cap screw 8 which extends through the supporting or carrying bar 1 and through either of the angled ends 4 or 6. A nut 9 is threaded on the cap screw 8, and a radially split washer 10 is provided which is of the usual construction employed in such joints so as to provide a relatively tight pivot and supply sufficient friction to firmly hold the bars 2 and 3 in their adjusted positions relative to each other and relative to the carrying bar 1. The measuring bar 3 is substantially square in cross section so as to adapt it to carry various types of instruments, if it is so desired and it has its end 11, which receives the pivoting bolt or screw therethrough flattened, as clearly shown in the drawings.

The angled end 6 of the measuring bar 3 is considerably longer than the angled end 4 of the mouth bar 2 so as to permit a relatively wide range of movement between the bars 2 and 3. It will be noted, that irrespective of the relative positions of the bars 2 and 3 they will at all times remain parallel and consequently it will be a comparatively simple matter to accurately establish the occlusal plane or the plane of contact of the teeth of the patient, with the use of the novel parallelometer.

In use, to accurately establish the parallelism of and location of the occlusal plane, horizontally, the mouth bar 2 is placed in the mouth of the patient across his face as shown in Fig. 1 of the drawings and the measuring bar 3 is adjusted so that it is in the same plane and parallel to a line drawn through the pupils of the eyes of the patient, and to establish the antero-posterior occlusal plane the bar 1 is inserted in the mouth of the patient inside the cheek and with mouth bar 2 in contact with plane on one side and the measuring bar 3 is adjusted to extend on a line from the top of the external auditory meatus to the base of the alæ of the nose, as shown in Fig. 2, it being known that a line drawn from these points on the face of a patient is parallel to the occlusal plane of the jaw teeth of the patient.

It is, of course, to be understood that the invention may be constructed in other manners and the parts associated in different relations and, therefore, I do not desire to be limited in any manner except as set forth in the claims hereunto appended.

Having thus described my invention what I claim is:

1. A dental instrument for determining the occlusal plane, comprising a pair of parallel bars, means supporting said bars in normal parallel relation, additional means pivotally connecting said bars to the supporting means in such manner as to maintain the parallelism of said bars at all times.

2. A dental instrument for determining the occlusal plane, comprising a carrying bar, a mouth bar pivotally carried by said carrying bar, and a measuring bar pivotally carried by the carrying bar, means for connecting the mouth bar and measuring bar to said carrying bar to permit adjustment of the mouth and measuring bars relative to the carrying bar, said mouth and measuring bars being disposed in parallel relation and connected to the carrying bar in such manner as to maintain the parallelism of the mouth and carrying bar at all times.

3. A dental instrument for determining the occlusal plane of dentures, comprising a carrying bar, a mouth bar having a right angularly disposed end portion, a measuring bar having a right angularly disposed end portion, said right angularly disposed end portions being connected to said carrying bar to permit adjustment of the mouth and measuring bars relative to the carrying bar.

4. A dental instrument for determining the occlusal plane of dentures, comprising a carrying bar, a mouth bar having a right angularly disposed end portion, a measuring bar having a right angularly disposed end portion, means connecting said right angularly disposed end portions to said carrying bar to permit adjustment of the mouth and measuring bars, in parallel relation to each other, relative to each other and to the carrying bar.

5. A dental instrument for determining the occlusal plane of dentures, comprising a carrying bar, a mouth bar having a right angularly disposed end portion, a measuring bar having a right angularly disposed end portion, means connecting said right angularly disposed end portions to said carrying bar to permit adjustment of the mouth and measuring bars, in parallel relation to each other, relative to each other and to the carrying bar, the angular end portion of said measuring bar being proportionately longer than the angle end portion of the mouth bar.

In testimony whereof I affix my signature.

DANIEL J. LEARY.